(12) United States Patent
Kim

(10) Patent No.: US 6,970,482 B2
(45) Date of Patent: Nov. 29, 2005

(54) APPARATUS AND METHOD FOR DEMULTIPLEXING OF TRANSPORT STREAM

(75) Inventor: Sung-tae Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 783 days.

(21) Appl. No.: 09/840,148

(22) Filed: Apr. 24, 2001

(65) Prior Publication Data

US 2002/0015426 A1    Feb. 7, 2002

(30) Foreign Application Priority Data

Jul. 14, 2000    (KR) ............... 2000-40629

(51) Int. Cl.[7] ............................... H04J 3/02
(52) U.S. Cl. ..................... 370/542; 370/536
(58) Field of Search .................. 370/542, 536, 370/412, 428, 535, 401, 386, 463, 419, 537, 370/485, 486, 487, 488, 395.64

(56) References Cited

U.S. PATENT DOCUMENTS 6,252,907 B1 * 6/2001 Hwang .................. 375/240.25
6,359,911 B1 * 3/2002 Movshovich et al. ....... 370/536
6,434,170 B1 * 8/2002 Movshovich et al. ....... 370/536
6,438,145 B1 * 8/2002 Movshovich et al. ....... 370/536
6,731,657 B1 * 5/2004 Anderson et al. .......... 370/536

FOREIGN PATENT DOCUMENTS

| CN | 12290552 | 9/1999 |
|---|---|---|
| JP | 2000-83064 | 3/2000 |
| WO | 99/60736 | 11/1999 |
| WO | 9960736 | 11/1999 |

* cited by examiner

Primary Examiner—Brian Nguyen
(74) Attorney, Agent, or Firm—Staas & Halsey LLP

(57) ABSTRACT

A transport stream (TS) demultiplexer has a TS input switch unit and an output switch unit, whereby inputs and outputs can be selected as desired, external output can be easily changed by changing selected information of the TS input switch unit and the output switch unit, without changing inputs. Therefore, the TS demultiplexer receives a plurality of TSs such as MPEG-2 TSs and DSS TSs, and can selectively demultiplex the TSs, and particularly, the TS demultiplexer can store the TSs in a storage medium such as a hard disc drive, or it can easily transmit the TS data over an IEEE1394 bus or a PCI bus.

23 Claims, 2 Drawing Sheets

APPARATUS AND METHOD FOR DEMULTIPLEXING OF TRANSPORT STREAM

CROSS REFERENCE TO RELATED APPLICATIONS

This application claims the benefit of Korean Patent Application No. 00-40629 filed Jul. 14, 2000 the disclosure of which is incorporated herein by reference.

BACKGROUND OF THE INVENTION

1. Field of the Invention

The present invention relates to a demultiplexer, and more particularly, to a demultiplexing apparatus and method, which simultaneously demultiplexes a plurality of transport streams (TSs) having different structures so that TSs can be stored in a storage medium such as a hard disc drive (HDD), or TSs can be easily transmitted through an IEEE1394 or peripheral component interconnect (PCI).

2. Description of the Related Art

To transmit encoded audio, video and other supplement data (program selection information, program guide information, scramble information, etc.) in digital satellite broadcasting or ground wave broadcasting, data should be packetized, multiplexed into a program stream (PS) or a transport stream (TS), and then transmitted.

The TS is used mainly for the case where bit streams are to be transmitted through a medium which has a high possibility of errors. Within the TS, the size of a packet is fixed so that parity information can be added for error correction.

In the case when using moving picture experts group-2 (MPEG-2), the size of a TS packet is fixed at 188 bytes, and each packet is formed of a 4-byte header and a 184-byte payload.

Meanwhile, in the case when using distributed sample scramble (DSS), the size of a TS packet is fixed at 130 bytes, and each packet is formed of a 2-byte prefix (header) field and a 128-byte transmission block (payload).

The header of each packet contains packet identification (PID, or SCID in DSS's case), which indicates what information is loaded in the payload, and scramble information as well. The payload loads video, audio, and other tables, wherein the tables include a program map table (PMT) and a program association table (PAT), which is formed by the program map tables.

The DSS TS demultiplexer has been implemented in various ways by multiple companies, and the models can be roughly divided into two types: a type having an embedded microprocessor for demultiplexing, and the other type without the microprocessor.

Meanwhile, the MPEG-2 TS demultiplexer of C-cube Co., which is now widely used, has an embedded Reduced Instruction Set Computer (RISC) engine. This demultiplexer cannot process a DSS TS, but can process an MPEG-2 TS.

There are demultiplexers sold by some companies in addition to C-cube's demultiplexer. However, these demultiplexers cannot process a DSS TS, or even when a DSS TS can be processed, these demultiplexers cannot simultaneously process a DSS TS and MPEG-2 TS due to limitations of having only one input for receiving a TS. Also, in a TS transmitted through PCI or IEEE1394, a predetermined packet cannot be replaced with a new packet, and a path for processing TS data cannot be changed in a state where the TS input is fixed.

SUMMARY OF THE INVENTION

To solve the above and other related problems, it is an object of the present invention to provide an apparatus and method for demultiplexing a plurality of transport streams (TSs) having different structures, and either storing the TSs in a storage medium such as an HDD, or making transmission of the TSs over an IEEE1394 bus or a PCI bus easier.

Additional objects and advantages of the invention will be set forth in part in the description which follows and, in part, will be obvious from the description, or may be learned by practice of the invention.

To accomplish the foregoing objects of the present invention, there is provided a transport stream (TS) demultiplexer for demultiplexing a plurality of transport streams of data having different structures, the TS demultiplexer having a TS input switch unit selecting TS data to be processed among a plurality of TSs of data; a packet identification (PID) filter unit extracting only packets of data having designated PIDs among TS data selected in the TS input switch unit, and outputting the extracted packets as program data; a descrambler unit descrambling program data output from the PID filter unit; an external output interface unit selecting desired program data among extracted packets of program data provided from the PID filter unit and program data provided from the descrambler unit, and outputting the selected program data to interface externally; and a CPU unit controlling each operation of the above units to demultiplex the plurality of received TSs of data.

Since the TS demultiplexer has a TS input switch unit and an output switch unit, wherein inputs and outputs can be selected as desired, the external output can be easily changed by changing only the selected information of the TS input switch unit and output switch unit without changing inputs.

Therefore, the demultiplexer of the present invention can selectively demultiplex multiple types of input data such as MPEG-2 TSs and DSS TSs, and particularly, can store the data in a storage medium such as a hard disc drive, or make data transmission over a IEEE1394 bus or a PCI bus easier.

BRIEF DESCRIPTION OF THE DRAWINGS

These and other objects and advantages of the present invention will become apparent and more readily appreciated from the following description of the preferred embodiments thereof, taken in conjunction with the accompanying drawings in which.

DETAILED DESCRIPTION OF THE INVENTION

Figure 1:
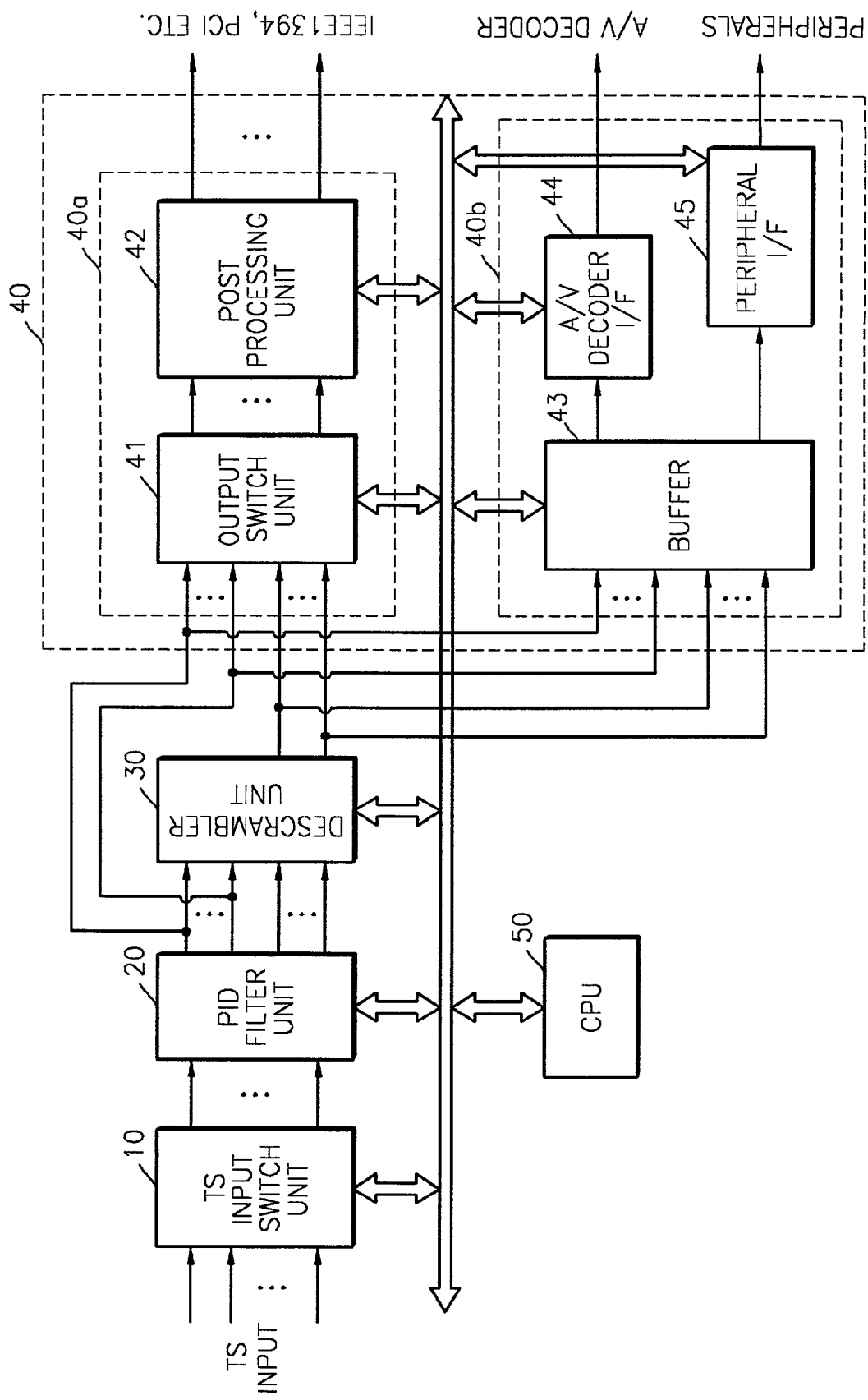
FIG. 1 illustrates a block diagram of an apparatus for demultiplexing a transport stream (TS) according to the present invention.

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

FIG. 1 illustrates the structure of a transport stream (TS) demultiplexer to which an embodiment of the present invention is directed.

A TS input switch unit 10 selects TS data among a plurality of received TS data and detects a synchronization signal of the selected TS data.

A packet identification (PID) filter unit 20 extracts packets of data having designated PIDs among TS data provided from the TS input switch unit 10, outputs the TS data as program data, and extracts scramble information from the header of a TS packet, which is required for descrambling by using the synchronization signal detected in the TS input switch unit 10.

A descrambler unit 30 descrambles the program data using the scramble information extracted from the PID filter unit 20, and key information and scramble modes set in a CPU 50. Also, when scrambling is needed for the external output, the descrambler unit 30 scrambles the program data. Here, program data means data formed of only packets having designated PIDs among TS data.

An external output interface unit 40 has a first external output interface unit 40a for storing the program data, which is processed by the above units, in the form of TS packets in a hard disc drive over a PCI bus, or transmitting the program data externally over an IEEE1394 bus through a network, and a second external output interface unit 40b for grouping the program data into audio/video data and supplemental data, and then transmitting the grouped data externally through an audio/video (A/V) decoder and a peripheral interface, respectively, to reproduce the program data.

The first external output interface unit 40a has an output switch unit 41 for selecting desired program data among a plurality of input program data, and a post-processing unit 42 for deleting or replacing a predetermined packet for external output.

The second external output interface unit 40b has a buffer 43 for temporarily storing program data for reproduction, an A/V decoder interface unit 44 for transmitting audio/video data stored in the buffer 43 and processed by the CPU unit 50 (to be explained) to an A/V decoder (not shown), and a peripheral interface unit 45 for outputting supplemental data stored in the buffer 43 and processed by the CPU 50 over a PCI bus to external peripherals.

The CPU 50 controls internal operations of the demultiplexer, and demultiplexes received TS data into multiple types of data to be output. Also, the CPU 50 extracts a reference time value included on TS data, and using this value, synchronizes the system time of the demultiplexer to input TS data.

Figure 2:
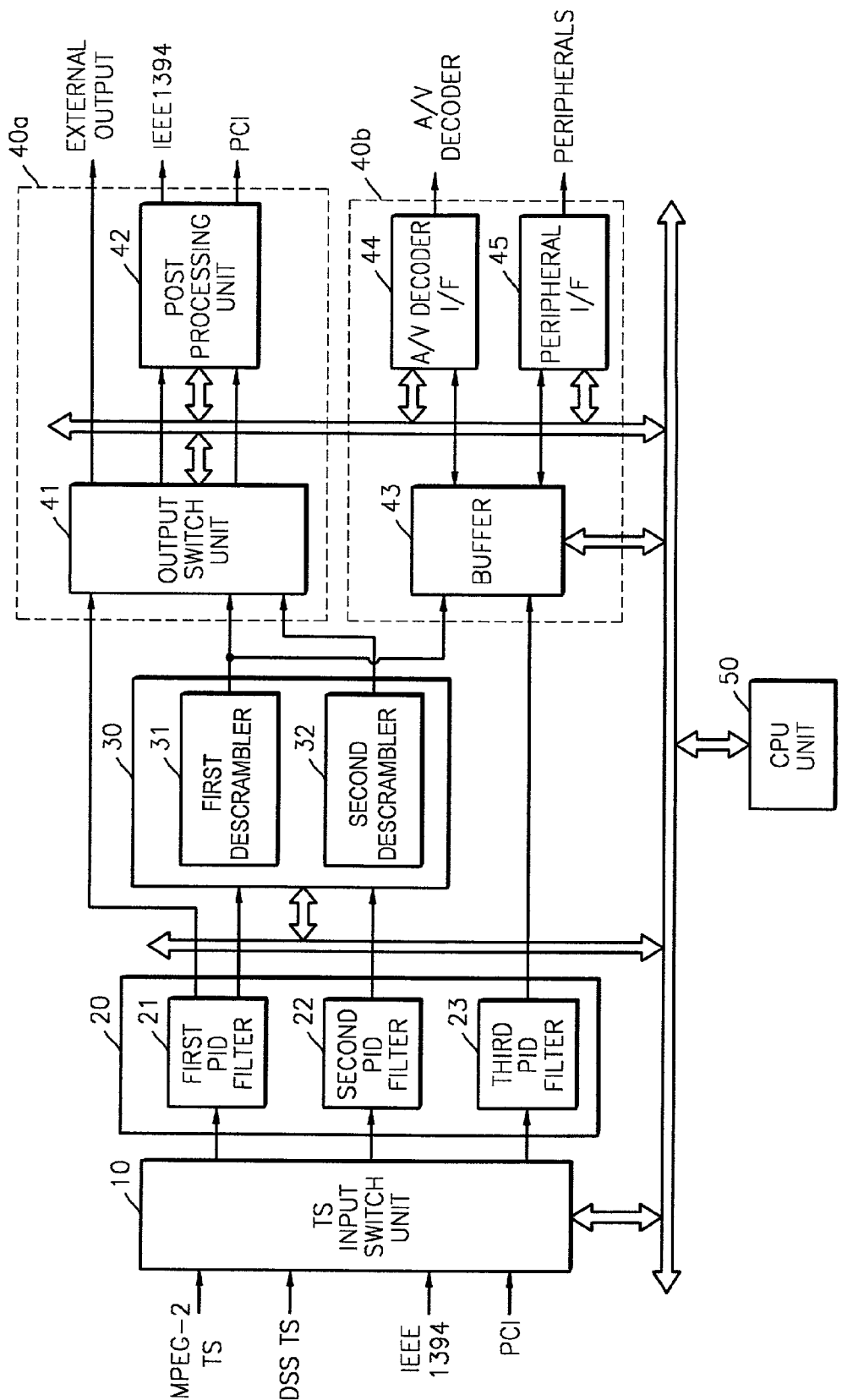
FIG. 2 illustrates a block diagram of an apparatus for demultiplexing a transport stream of the present invention in an embodiment based on the structure of FIG. 1.

The TS demultiplexer of FIG. 1 can be implemented as shown in FIG. 2.

Referring FIG. 2, the TS input switch unit 10 selects and outputs TS data in the form that the user wants, among a plurality of received TS data, according to a command from the CPU 50. At this time, the received TS data at input switch unit 10 includes MPEG-2 TSs having a packet structure of a 188-byte unit, DSS TSs having a packet structure of a 130-byte unit, TSs received over an IEEE1394 bus through a network, and TSs received over a PCI bus, and also other types of TSs can be included.

Further, the TS input switch unit 10 detects a synchronization signal to determine the header of a packet, and transmits the synchronization signal to the CPU 50.

TS data selected in the TS input switch unit 10 is transmitted to the PID filter unit 20. The PID filter unit 20 receives the synchronization signal from the CPU 50, extracts packet header information from the TS data provided from the TS input switch unit 10, and using the extracted packet header information, allows only the packets having designated PIDs to pass. Also, the PID filter unit 20, using the synchronization signal received from the CPU 50, extracts scramble information from the packet header, which is required for descrambling, and transmits the extracted scramble information to the CPU 50.

Packets which are passed through the PID filter unit 20 are then transmitted to either the descrambler unit 30, the output switch unit 41, or the buffer 43. The CPU 50 controls transmission to the descrambler unit 30, the output switch unit 41, or the buffer 43, according to the external output form that the user selects.

Program data stored in the buffer 43 is divided into audio/video data and supplemental data, and transmitted to the A/V decoder through the A/V decoder interface unit 44 and to peripherals through the peripheral interface unit 45.

The buffer 43 is a memory space for temporarily storing data, and the CPU 50 processes data stored in the buffer 43 using an address. For example, program data transmitted to the buffer 43 from the first descrambler 31 or the third PID filter 23 is stored in a divided memory location of the buffer 43 and processed by the CPU 50. Here, processing refers to classification and selection of data.

In the apparatus of FIG. 2, selection of input/output of the TS input switch unit 10 and the external output interface unit 40 is made by a selection input unit (not shown). The selection input unit can be implemented as an ordinary function key, or a program pop up menu.

The embodiment of FIG. 2 is implemented such that the first PID filter 21 transmits extracted packets of program data to the first descrambler 31 and/or the output switch unit 41, the second PID filter 22 transmits extracted packets of program data to the second descrambler 32, and the third PID filter 23 transmits extracted packets of program data to the buffer 43.

Therefore, according to the embodiment of FIG. 2, the user can reproduce and watch a desired program simultaneously while transmitting the program over an IEEE1394 through a network.

The CPU 50 transmits scramble information extracted by the PID filter unit 20 to the descrambler unit 30.

Using program data transmitted through the first PID filter 21 and the second PID filter 22 and scramble information provided from the CPU unit 50, the descrambler unit 30 descrambles the program data and outputs the descrambled program data. In addition to descrambling the scrambled program data, the descrambler unit 30 scrambles program data again when scrambling is needed to externally transmit the program data through the first external output interface unit 40A.

Program data output from the descrambler unit 30 is transmitted to the output switch unit 41 for external transmission, or to the buffer 43 for reproduction.

The output switch unit 41 selects and outputs program data to be externally transmitted, between program data transmitted from the PID filter unit 20 and program data transmitted from the descrambler unit 30. That is, program data received through the TS input switch unit 10 contains multiple programs (for example, programs from a plurality of broadcasting stations), and among them, only those programs which the user selects to be externally transmitted are ultimately output.

Meanwhile, it may be necessary to change supplemental information, such as program designation information or program guide information, which is required for demultiplexing the selected program data again later. Since a packet designated in the original program designation information can be discarded when only a predetermined packet is extracted for storing or transmitting the data processed by the apparatus shown in FIG. 2, output TS data may be incorrectly demultiplexed unless program designation information is changed and then stored. Therefore, to prevent this, the post-processing unit 42 outputs TS data after a predetermined packet has been removed or replaced with a new packet. However, program data which does not need this post-processing is directly transmitted externally.

Program data, which is output from the first external output interface unit 40a, through the above described processes, is externally transmitted over an IEEE1394 or a PCI bus.

Program data for reproducing audio/video reproduction is transmitted to the second external interface unit 40b. A TS data packet includes supplemental data, such as program designation information or additional information, as well as audio/video data, and in many cases, the supplemental data should be decoded in an external CPU. Therefore, program data transmitted from the first descrambler 31 or the third PID filter 23 to the buffer 43 is divided into audio/video data and supplemental data by the CPU 50. Then, divided audio/video data and supplemental data are transmitted, respectively, through the A/V decoder interface unit 44 to an A/V decoder (not shown), and through the peripheral interface unit 45 to peripherals. At this time, since most A/V decoders receive a packetized elementary stream (PES) or an elementary stream as input data, the A/V decoder interface unit 44 outputs a PES or an elementary stream, and the peripheral interface unit 45 transmits data mainly over a PCI bus.

In the present invention, the TS input switch unit 10 does not continuously select and process only one TS input. That is, while the TS input switch unit 10 selects an MPEG-2 TS to reproduce a program through the PID filter unit 20, a descrambler unit 30, and the second external output interface unit 40b, the TS input switch unit 10 can alternately select a DSS TS to transmit externally through the PID filter unit 20, the descrambler unit 30 and the first external output interface unit 40a.

Particularly, since the present invention has the TS input switch unit 10 and the output switch unit 41, input TS data and external output data can be easily changed as the user wants, by changing the selected information of the TS input switch unit 10 and the output switch unit 41 without changing input TS data.

As described above, since the TS demultiplexer of the present invention has the TS input switch unit 10 and output switch unit 41, wherein inputs and outputs can be selected as a user desires, the TS demultiplexer receives a plurality of TSs such as MPEG-2 TSs and DSS TSs, and reproduces a predetermined program simultaneously while transmitting the TSs externally over an IEEE1394 bus or a PCI bus.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A transport stream (TS) demultiplexer for demultiplexing a plurality of transport streams of data having different structures, the TS demultiplexer comprising:
   a TS input switch unit selecting TS data to be processed among the plurality of TSs of data;
   a packet identification (PID) filter unit extracting only packets of data having designated PIDs among the TS data selected in the TS input switch unit, and outputting the extracted packets as program data;
   a descrambler unit descrambling selectively the program data output from the PID filter unit;
   a first external output interface unit selecting desired program data from one of the program data provided by the PID filter unit and program data provided by the descrambler unit and outputting the selected program data;
   a second external output interface unit grouping the program data, which is provided by the descrambler unit, into audio/video data and supplemental data, to process the audio/video data and the supplemental data, and outputting the audio/video data and the supplemental data; and
   a CPU unit controlling operation of the TS input switch unit, the PID filter unit, the descrambler unit and the external output interface units to demultiplex the plurality of TSs of data.

2. The TS demultiplexer of claim 1, wherein the plurality of TS data comprises at least one of an MPEG-2 TS, a distributed sample scramble (DSS) TS, a TS over an IEEE1394 bus, and a TS over a PCI bus.

3. The TS demultiplexer of claim 1, wherein the TS input switch unit detects a synchronization signal for extracting header information of a packet in the selected TS.

4. The TS demultiplexer of claim 1, wherein the first external output interface comprises:
   an output switch unit selectively extracting a desired portion of the program data among a larger amount of the program data transmitted from the PID filter or from the descrambler unit; and
   a post-processing unit removing a predetermined packet or replacing the predetermined packet with a new packet to change program designation information of the program data selected by the output switch unit.

5. The TS demultiplexer of claim 4, wherein the first external output interface unit externally outputs program data through at least one of an IEEE 1394 bus and a CPI bus.

6. The TS demultiplexer of claim 1, wherein the first external output interface unit externally outputs program data through at least one of an IEEE1394 bus and a PCI bus.

7. The TS demultiplexer of claim 1, wherein the second external output interface unit comprises:
   a buffer temporarily storing the program data provided from the descrambler unit;
   an audio/video (A/V) decoder interface unit transmitting the audio/video data among the program data stored in the buffer, to an A/V decoder; and
   a peripheral interface unit externally transmitting information data other than the audio/video data among the program data stored in the buffer.

8. The TS demultiplexer of claim 1, wherein the descrambler unit scrambles the descrambled program data for external transmission.

9. The transport stream demultiplexer of claim 1, wherein the packet identification filter unit further uses a synchronization signal received from the CPU to extract scramble information from a packet header and transmits the extracted scramble information to the CPU.

10. The transport stream demultiplexer of claim 1, wherein the descrambler unit scrambles program data when scrambling is needed.

11. The transport stream demultiplexer of claim 1, wherein the first external output interface unit or the second external interface unit outputs the program data after a predetermined packet has been removed therefrom or replaced with a new packet.

12. A method of simultaneously demultiplexing plural transport streams of data having different structures, comprising:
selecting a first transport stream data to be processed among the plural transport streams;
selecting a second transport stream data, having a different structure than the first transport stream data, among the plural transport streams;
extracting first packets of data having designated packet identification among the selected first transport stream data and second packets of data having designated packet identification among the selected second transport stream data;
modifying the extracted first and second packets as first and second program data, respectively;
descrambling a portion of at least one of the modified first and second program data; and
externally interfacing select program data among the first and second modified program data and the descrambled portion of the at least one of the modified first and second program data.

13. The method according to claim 12, wherein the plural transport streams of data having different structures is at least one of an MPEG-2 transport stream, a distributed sample scramble transport stream, a transport stream over an IEEE1394 bus, and a transport stream over a PCI bus.

14. The method according to claim 12, wherein the selecting the first and second transport stream data to be processed among the plural transport stream data further comprises extracting header information of a packet in each of the selected first and second transport stream data based upon a detected synchronization signal.

15. The method according to claim 14, wherein the externally interfacing of the select program data among the modified first and second program data and the descrambled portion of the at least one of the modified first and second program data further performs the operation of outputting the selected program data through at least one of an IEEE1394 bus and a PCI bus.

16. The method according to claim 12, wherein the externally interfacing of the select program data among the first and second modified program data and the descrambled portion of the at least one of the first and second modified program data further comprises grouping one of the descrambled first and second modified program data into audio/video data and supplemental data information to process audio/video data to be externally interfaced.

17. The method according to claim 16, wherein the externally interfacing of the select program data among the modified first and second program data and the descrambled portion of the at least one of the modified first and second program data further performs the operation of outputting the selected program data through at least one of an IEEE1394 bus or a PCI bus.

18. The method according to claim 16, wherein the grouping comprises:
temporarily storing the one of the descrambled first and second modified program data;
transmitting the audio/video data among the stored program data to an audio/video decoder; and
externally transmitting information data other than the audio/video data among the stored program data.

19. The method according to claim 12, further comprising scrambling the descrambled modified program data for external transmission.

20. The method according to claim 19, wherein said transport streams further include a transport stream received over an IEEE1394 bus and a transport steam received over a PCI bus.

21. A method of demultiplexing plural transport streams of data having different structures comprising:
selecting transport stream data to be processed among the plural transport streams;
extracting packets of data having designated packet identification among the plural transport stream data, and modifying the extracted packets as program data;
descrambling a portion of the modified program data;
selectively extracting desired program data among a larger amount of program data including the modified program data and the descrambled portion of the modified program data;
externally interfacing the desired program data among the modified program data and the descrambled portion of the modified program data; and
removing a predetermined packet or replacing the packet with a new packet to change program designation information of the desired program data selected to be externally interfaced.

22. A method of demultiplexing a plurality of transport streams of data having different structures comprising:
selecting first transport stream data having a first structure and second transport stream data having a second structure to be processed among the plurality of transport streams of data;
extracting first packets of data having designated packet identification among the selected first transport stream data and extracting second packets of data having designated packet identification among the selected second transport stream data, and modifying the extracted first and second packets as first program data and second program data;
descrambling a portion of the modified first and second program data; and
displaying the first program data selected by a user while simultaneously transmitting the second program data over an IEEE1394 bus.

23. The method according to claim 22, wherein the selected transport streams are stored in a hard disk drive.

* * * * *

UNITED STATES PATENT AND TRADEMARK OFFICE
CERTIFICATE OF CORRECTION

PATENT NO. : 6,970,482 B2
APPLICATION NO. : 09/840148
DATED : November 29, 2005
INVENTOR(S) : Sung-Tae Kim Page 1 of 1

It is certified that error appears in the above-identified patent and that said Letters Patent is hereby corrected as shown below:

Column 8, line 14, Claim 20, replace "steam" with --stream--, therefor.

Signed and Sealed this

Twenty-second Day of August, 2006

JON W. DUDAS
*Director of the United States Patent and Trademark Office*